US006966612B2

(12) United States Patent
Philpott

(10) Patent No.: US 6,966,612 B2
(45) Date of Patent: Nov. 22, 2005

(54) TAG AXLE ASSEMBLY

(75) Inventor: Daniel Philpott, Rochester, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 10/625,980

(22) Filed: Jul. 24, 2003

(65) Prior Publication Data

US 2005/0017572 A1 Jan. 27, 2005

(51) Int. Cl.[7] .............................................. B60B 35/00
(52) U.S. Cl. ................................. 301/128; 280/124.11
(58) Field of Search ............................. 301/124.1, 128; 280/86.5, 124.11

(56) References Cited

U.S. PATENT DOCUMENTS 3,179,439 A * 4/1965 Janeway ................ 280/124.11
4,065,153 A * 12/1977 Pringle ...................... 280/86.5
4,171,830 A * 10/1979 Metz ......................... 280/86.5
4,181,189 A 1/1980 Hobbensiefken
4,223,910 A * 9/1980 Fry ....................... 280/124.11
4,492,389 A * 1/1985 Wyatt et al. ............... 280/86.5
4,993,729 A 2/1991 Payne
5,370,196 A * 12/1994 Bishop .................... 180/24.02
6,086,162 A * 7/2000 Pinch et al. ............. 301/124.1
6,416,136 B1 * 7/2002 Smith ......................... 301/128
6,419,247 B1 * 7/2002 Moran ....................... 280/86.5

* cited by examiner

*Primary Examiner*—Russell D. Stormer
(74) *Attorney, Agent, or Firm*—Carlson, Gaskey & Olds

(57) ABSTRACT

A tag axle assembly includes an axle housing having first and second ends. A torque plate is fixed to each of the first and second ends for mounting a braking assembly. The torque plate is attached between front and rear plates of the axle housing. The tag axle assembly is fabricated by forming a substantially rectangular housing having open first and second ends and at least a partially open bottom portion. The torque plate is fixed at the open ends of a tubular housing that extends the entire length of the rectangular housing. The torque plates and the axle housing are secured to the housing and a center portion of the axle housing is cut away to provide for the drive shaft to extend through to the tag axle.

15 Claims, 5 Drawing Sheets

TAG AXLE ASSEMBLY

BACKGROUND OF THE INVENTION

This invention generally relates to an axle assembly and more specifically to a tag axle assembly and a method of fabricating a tag axle assembly for a motor vehicle.

Typically heavy trucks include driven tandem axles to support the weight of a towed trailer. Driven tandem axles are relatively complicated and expensive due to the need to drive each of the axles.

In some vehicle configurations it is desirable to position the driven axle to the rear of the non-driven axle to provide desired vehicle stability and handling characteristics. In such configurations the tag axle is disposed between the motor and the driven axle. Therefore, the tag axle includes a generally U shaped configuration to allow the drive shaft to extend to the driven axle. The axles include similar suspension and braking systems as compared to the driven axle.

Loads exerted on a tag axle assembly can be relatively large, which may require robust fabrication techniques, which are often not cost efficient. Further, because a tag axle does not use an axle that extends across the vehicle frame, independent spindles are used at each end. The independent spindles may be difficult and time intensive to align and may require significant reinforcement.

Current tag axle assemblies include a housing built from heavy-duty steel plate. Each spindle assembly is bolted to a torque plate. The torque plate is a separate plate bolted to the housing that provides for mounting of the spindle and brake assembly. The torque plate is secured to the housing assembly by a plurality of bolts. The connection between the torque plate and the housing is highly stressed and may require particular components that are relatively expensive to manufacture. The use of special components increases costs and contributes to inconsistencies that can affect quality.

Accordingly it is desirable to provide a tag axle assembly and method of construction that minimizes the use of expensive and complicated components.

SUMMARY OF INVENTION

The present invention is a tag axle assembly for a motor vehicle that includes an integrally formed torque plate, and a method of fabricating a tag axle assembly using relatively uncomplicated components.

The tag axle assembly of the present invention includes an axle housing constructed of rectangular plate members. A torque plate is attached as the end plate of the housing. The axle housing assembly includes the torque plate thereby eliminating the joint between the torque plate and the housing.

The present invention also includes a method of fabricating a tag axle assembly using a standard axle assembly to align spindle assemblies on each side of the axle assembly. The axle assembly extends the entire width of the axle housing and is mounted to the open ends and bottom sections of the axle assembly. The axle assembly includes the spindle assemblies disposed at each end. The axle assembly and torque plate are welded to the axle housing. A center section of the axle assembly is then cut and removed. This method of mounting the spindle assemblies to the axle housing simplifies alignment of spindles during manufacture.

Accordingly the tag axle assembly of this invention provides an assembly and method of construction that minimizes the use of expensive and complicated components.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
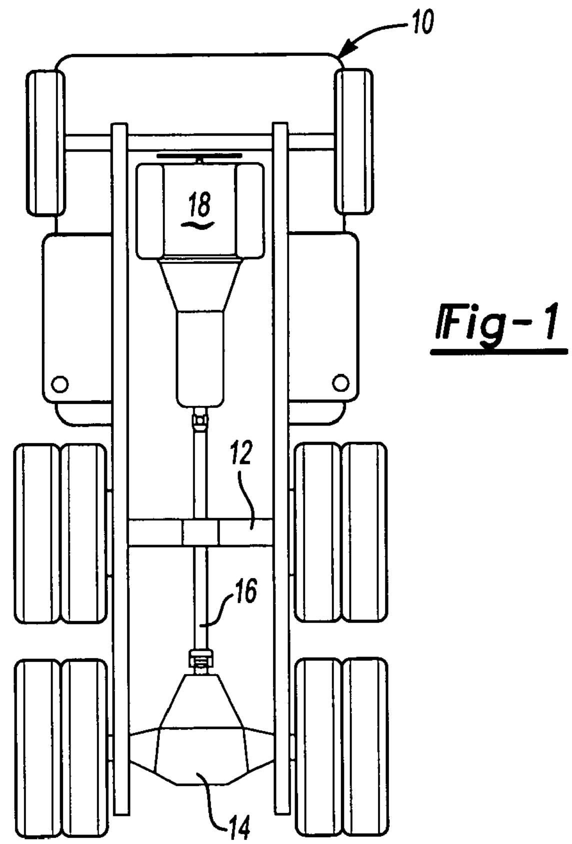
FIG. 1 is a schematic view of a motor vehicle including a tag axle assembly.

Referring to FIG. 1, a motor vehicle 10 includes a front axle and tandem rear axles. Typically, the two rear axles at least partially support the load of a trailer (not shown). An engine 18 rotates a drive shaft 16 that drives a driven axle 14 disposed adjacent a rearward segment of the motor vehicle 10. The motor vehicle 10 includes a non-driven tag axle assembly 12 disposed between the engine 18 and the driven axle 14. Because the tag axle assembly 12 is disposed between the driven axle 14 and the engine 18 the drive shaft 16 must extend through or under the tag axle assembly 12.

Figure 2:
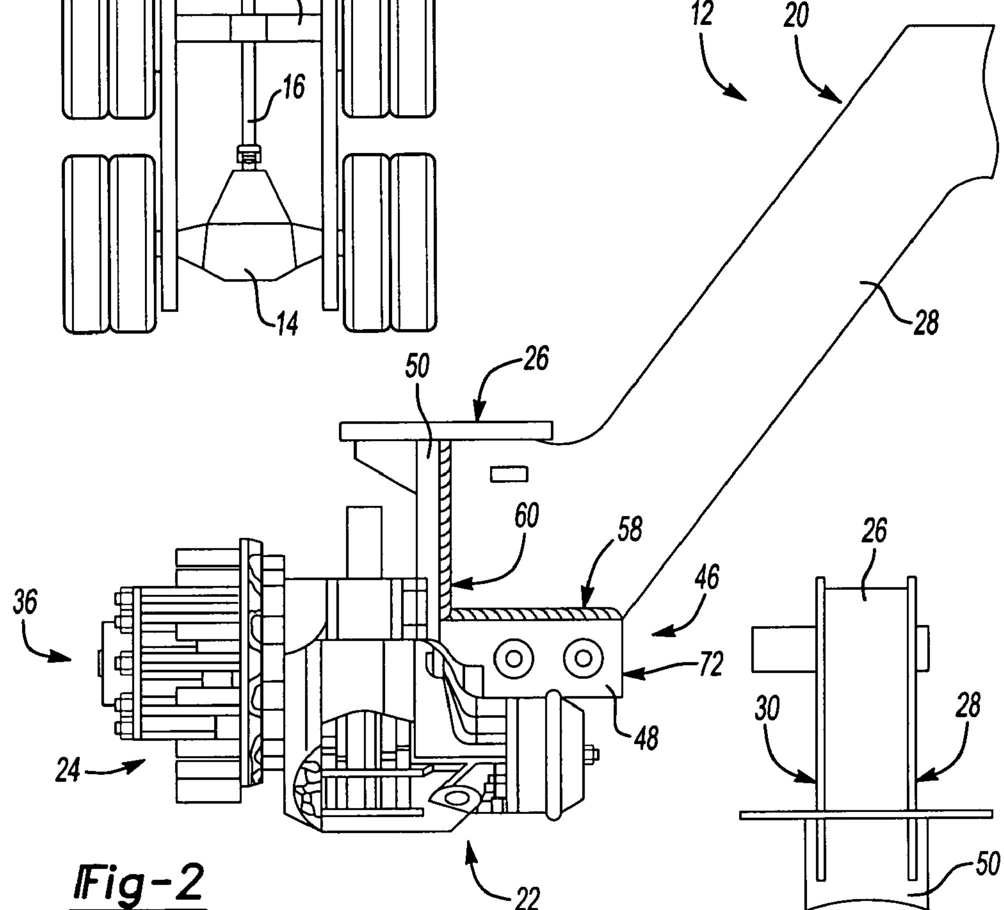
FIG. 2 is a plane view of one end of a completed tag axle assembly including brake and hub assemblies.

Referring to FIG. 2, a first segment 36 of the tag axle assembly 12 includes an axle housing 20 supporting a spindle assembly 46. The spindle assembly 46 is welded to the axle housing 20 at weld 58. Attached to the axle housing 20 and mounted to a torque plate 50 are a brake assembly 22 and hub assembly 24. The brake assembly 22 and hub assembly 24 are as known to a worker skilled in the art. It is within the contemplation of this invention that any configuration brake assembly and hub assembly known to a worker skilled in the art can be used and is dependent on application specific requirements.

Figure 3:
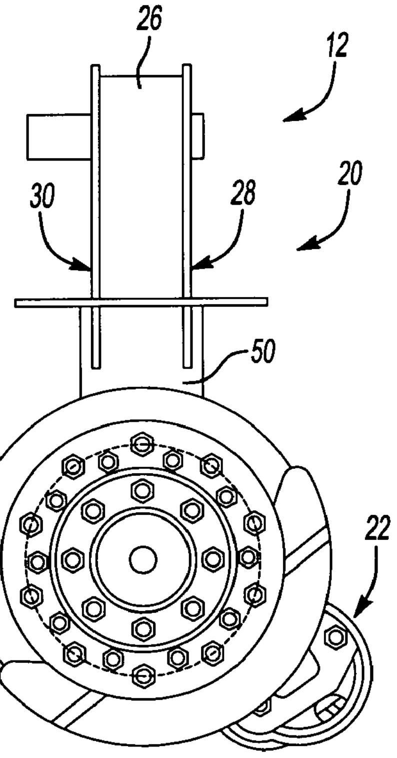
FIG. 3 is a side view of the completed tag axle assembly.

Referring to FIG. 3, the axle housing 20 includes a front plate 28 and a rear plate 30. The front plate 28 and rear plate 30 are attached to each other and spaced a distance apart by a top plate 26. The top plate 26 extends between the front and back plates 28,30 to form the generally rectangular axle housing 20. The axle housing 20 includes an overall inverted U-shaped configuration. The inverted U-shaped configuration of the axle housing 20 provides for the drive shaft 16 to extend between the motor 18 and driven axle 14.

Figure 4:
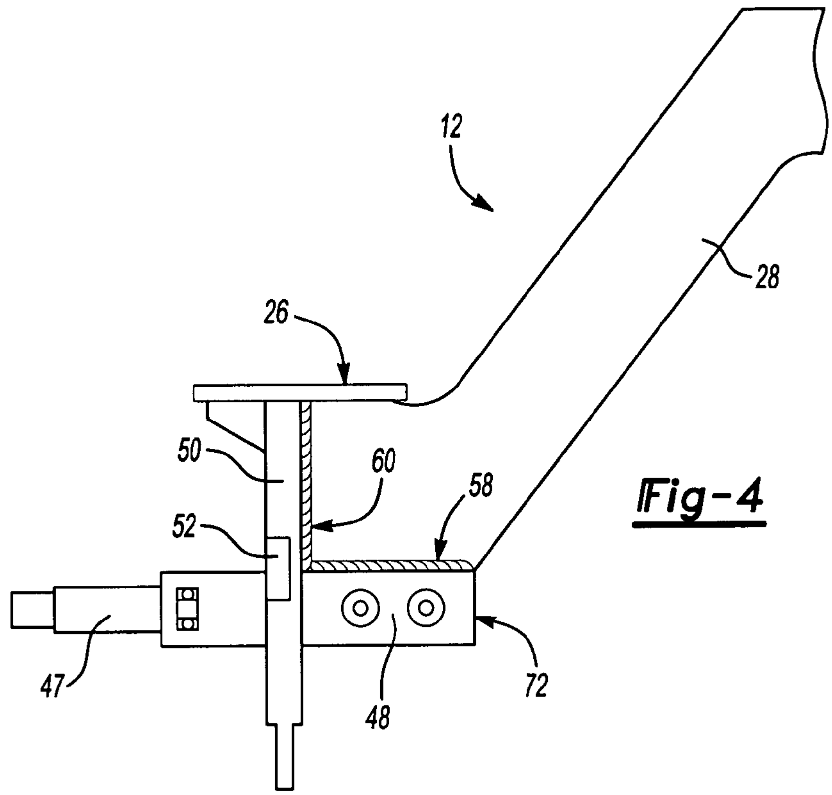
FIG. 4 is a plane view of a tag axle assembly without the brake or hub assemblies.
Figure 5:
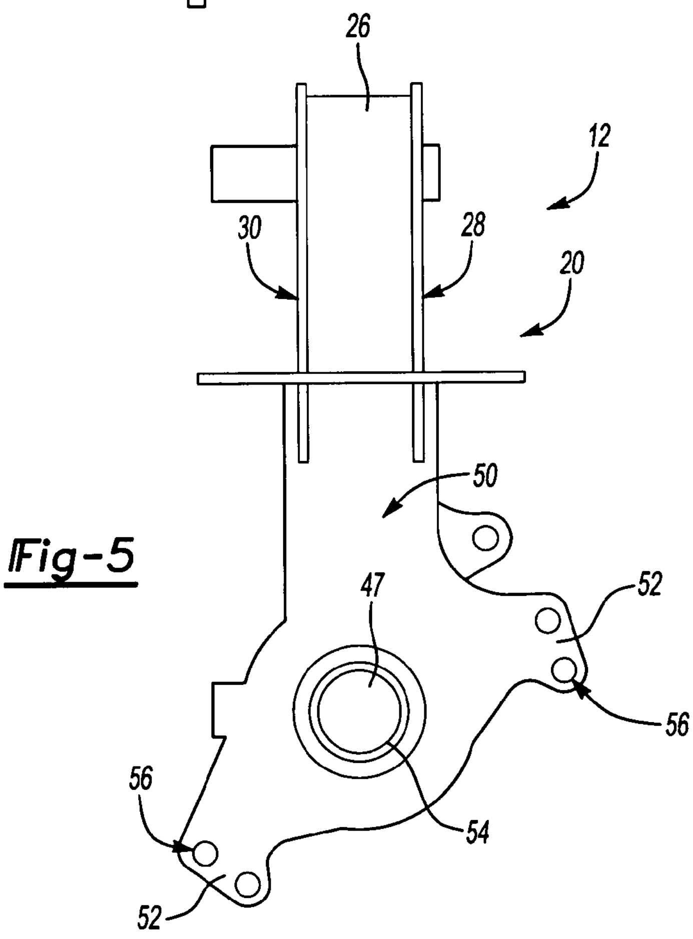
FIG. 5 is a end view of the tag axle assembly and torque plate.

Referring to FIG. 4, the tag axle assembly 12 is shown without the brake assembly 22 and hub assembly 24 to provide further clarity on the construction of the axle housing 20. The axle housing 20 includes the front and rear plates 28,30 and also includes the torque plate 50. The torque plate 50 is preferably an integral portion of the axle housing 20 and provides for the mounting of the braking assembly 22. The torque plate 50 is welded in place with at least a portion of the thickness of the torque plate 50 disposed within a space defined between the front and rear plates 28, 30.

The torque plate 50 includes a central opening 54. The central opening 54 provides for the spindle assembly 46 to extend there through. A spindle housing 48 of the spindle assembly 46 is attached to the axle housing 20. The spindle housing 48 becomes the bottom portion of the axle housing 20. The torque plate 50 includes flanges 52 for mounting of the brake assembly 22. Each of the flanges 52 includes openings 56 for brake assembly fasteners. The openings 56 may be threaded to correspond to threads of the fasteners used to mount the brake assembly 22.

Figure 6:
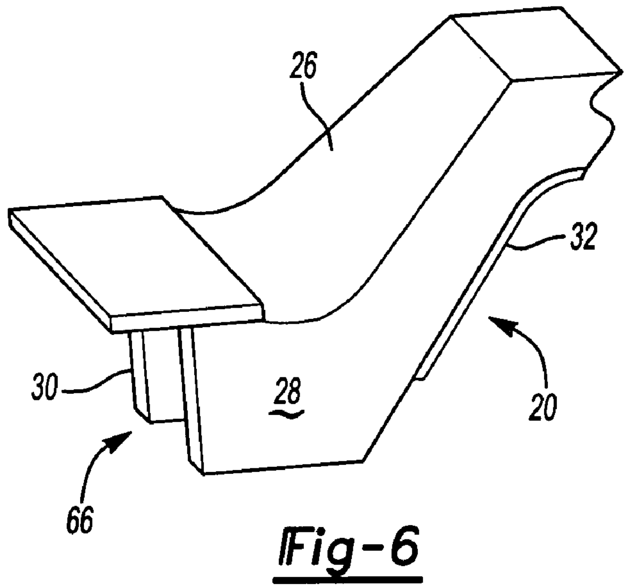
FIG. 6 is a prospective view of the housing of the tag axle assembly.
Figure 7:
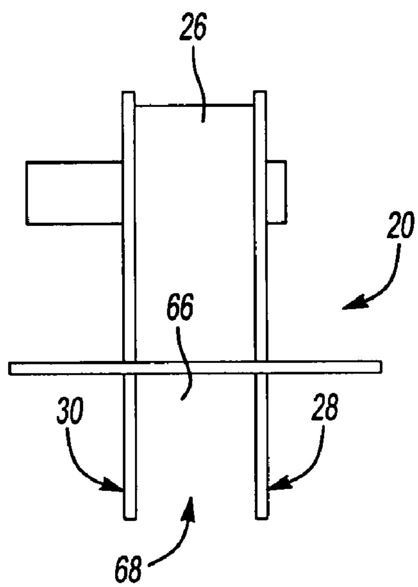
FIG. 7 is an end view of the housing of the tag axle assembly.
Figure 8:
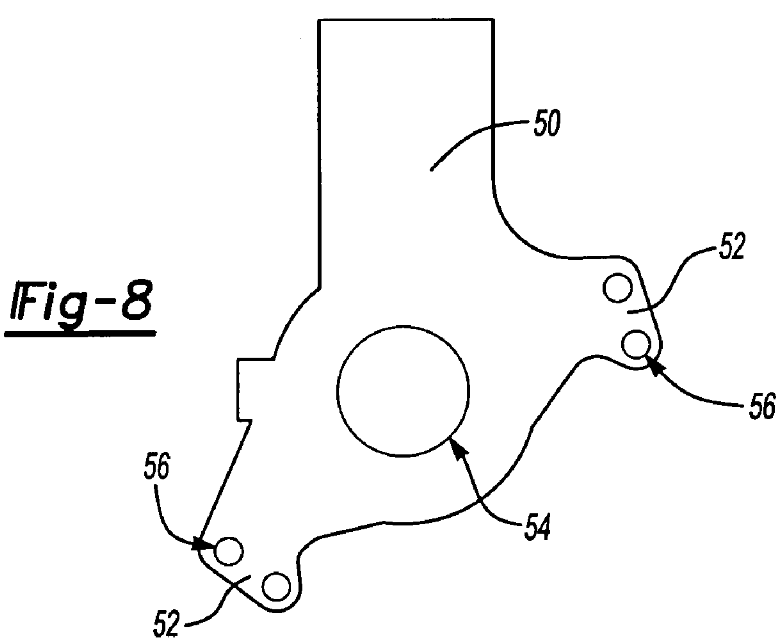
FIG. 8 is a plan view of the torque plate.

Referring to FIGS. 6–8, construction of the axle housing 20 includes the attaching of the front plate 28 to the top plate 26 and the back plate 30 also attached to the top plate 26. A bottom plate 32 is disposed to cover areas that are not covered by the spindle assembly 46. The bottom plate 32 is welded between the front and back plates 28,30. The axle housing 20 in a semi-assembled position includes an open end 66 for receiving the torque plate 50. The axle housing 20 also includes an open bottom portion 68 for receiving the spindle assemblies 46.

Figure 9:
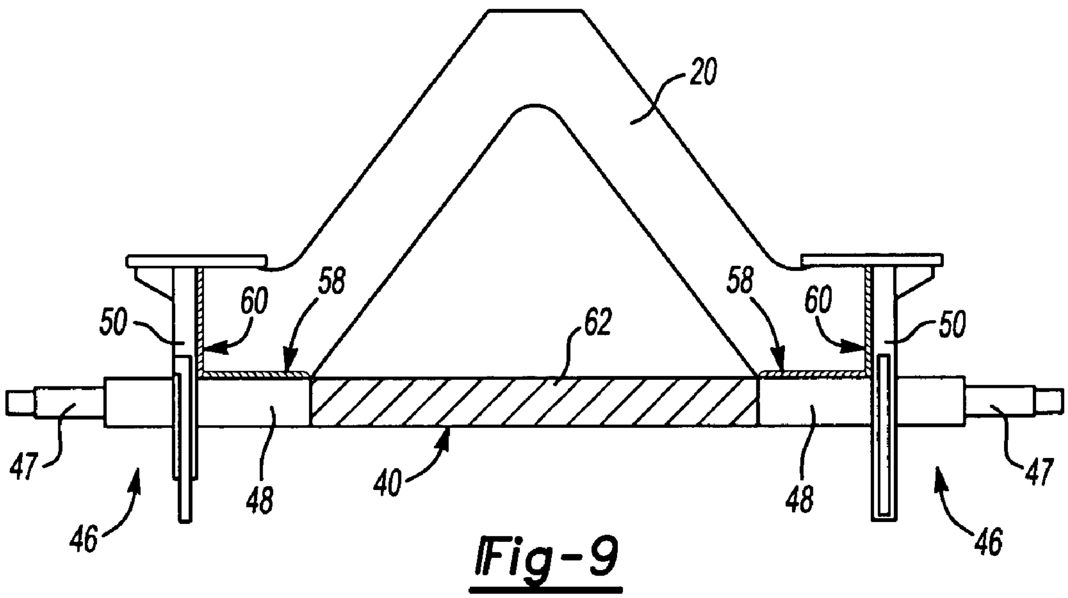
FIG. 9 is a plan view of the axle assembly according to this invention including the axle assembly before removal of a center portion.
Figure 10:
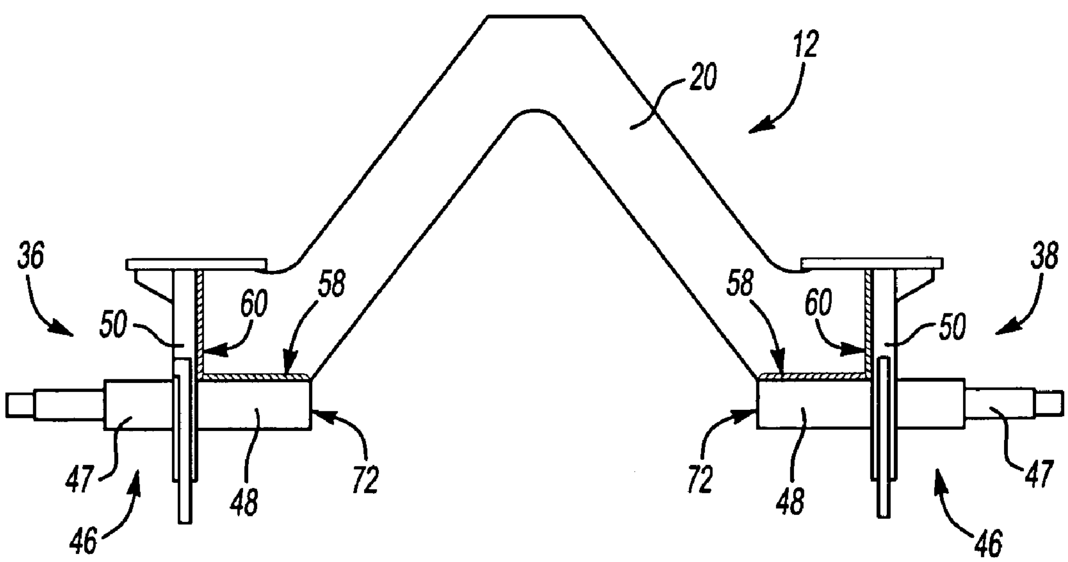
FIG. 10 is a plan view of the tag axle assembly of this invention after removal of the axle assembly center portion.

Referring to FIGS. 9 and 10, a portion of the final assembly of the tag axle assembly 12 is shown. FIG. 9 shows the tubular axle assembly 40 and the axle housing 20. The spindle assembly 46 is preferably a portion of an existing standard tubular axle assembly 40. The tubular axle assembly 40 includes spindle assemblies 46 at each end, but only a hollow tubular member extending therebetween. The use of an existing standard tubular axle assembly 40 common to those already used for trailer applications decreases the expense and eliminates special fabrication of parts for the tag axle assembly 12.

Welds 58 and 60 secure the tubular axle assembly 40 and torque plate 50 to the axle housing 20. As is shown in FIG. 9, at this stage in assembly the entire tubular axle assembly 40 is attached to the axle housing 20. Using the entire tubular axle assembly 40 provides for alignment of each of the spindle assemblies 46 relative to each other with minimal gauging and/or fixturing. After attachment of the torque plate 50 and the tubular axle assembly 40 to the axle housing 20 a center portion 62 of the tubular axle assembly 40 is removed to provide the final overall inverted U-shape of the tag axle assembly 12.

Integration of the torque plate 50 with the axle housing 20 minimizes complicated highly stressed and expensive mounting and fasteners. Further, the alignment provided by the use of the tubular axle assembly 40 decreases expense and improves manufacturing efficiency.

Figure 11:
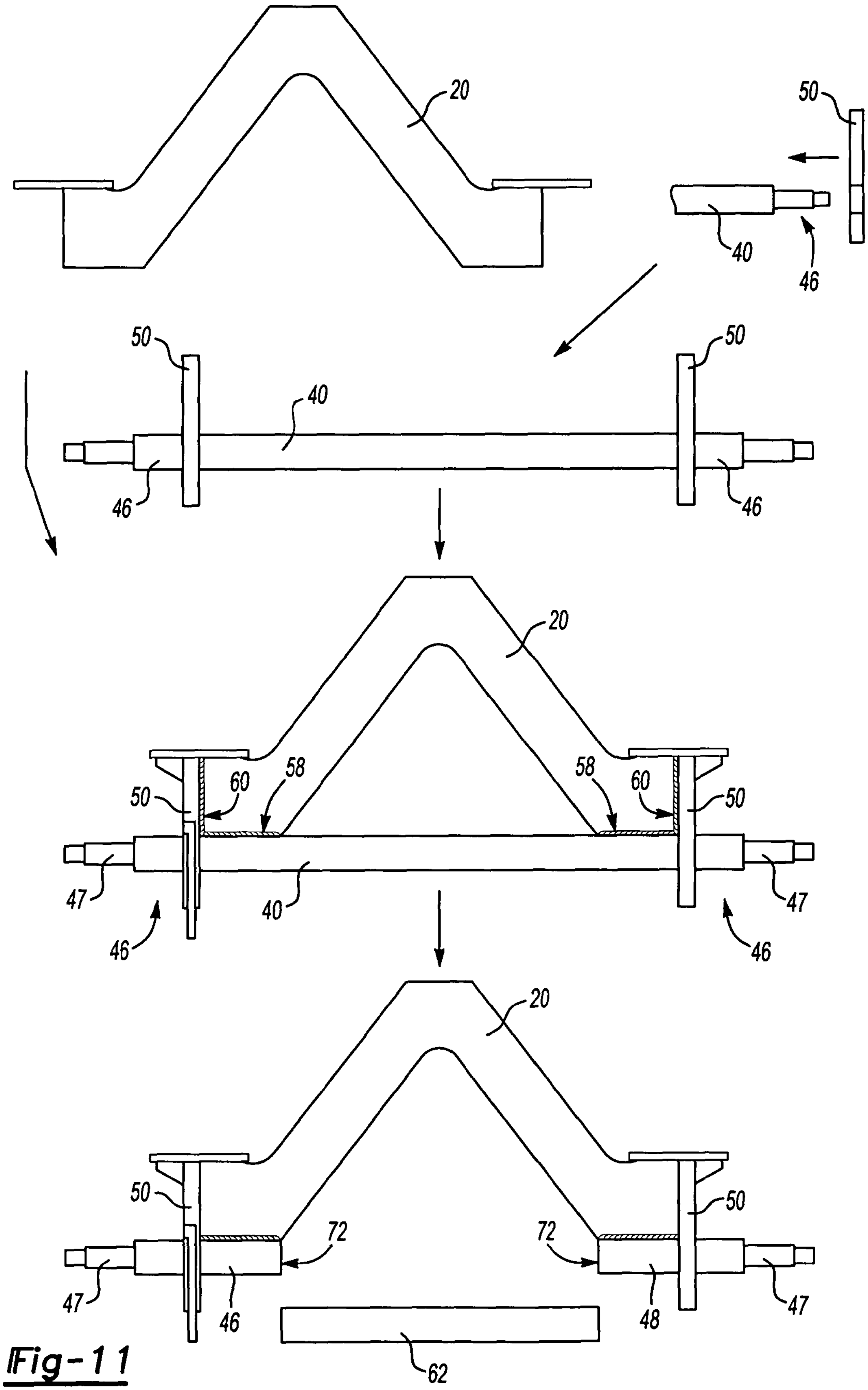
FIG. 11 is a flow diagram illustrating the steps of fabricating the tag axle assembly according to this invention.

Referring to FIG. 11, a method of this invention includes the steps of fabricating an axle housing 20 by attaching a front and back sheet of material to a top sheet and a bottom sheet to form a generally rectangular axle housing and cross section. The axle housing includes an inverted U-shape to provide for the drive shaft 16 to extend between the engine and driven axle at the rear of the vehicle 10. The tubular axle assembly 40 is provided and the torque plate 50 is attached to each end of the tubular axle assembly 40.

The axle housing 20 and the tubular axle assembly 40 that includes both torque plates 50 and spindle housing assemblies 47 at each end are then combined into one intermediate assembly. The tubular axle assembly 40 is welded to the axle housing 20. The torque plate 50 is welded to the axle housing 20.

The method also includes the steps of aligning the spindle assemblies 46 at each end of the axle housing 20 by way of the tubular axle assembly 40. Alignment of the torque plates 50 and spindle assembly 46 relative to each other is simplified by the attachment of the single tubular axle assembly 40 that extends from the first and second ends of the axle housing 20. Upon completion of the welding of the torque plate 50 and spindle assemblies 46 to the axle housing 20 the center portion of the tubular axle assembly 40 is removed. The center portion 62 is removed to provide the overall configuration desired for the completed axle housing assembly 12.

After completion of the axle housing assembly 12, the inner ends 72 of the spindle housings 48 are sealed and the overall shape of the axle housing 12 is complete.

This method includes the torque plate 50 forming an end segment of the axle assembly 40 to minimize inefficient and highly stressed joints previously required to support spindle assemblies at each end of an axle housing. In addition, the tubular axle assembly 40 is used to align each of the spindle assemblies 46 at distal segments of the axle housing 20. The alignment function of the tubular axle assembly 40 eliminates inefficient and relatively costly fixturing and manufacturing steps. The complete axle housing assembly 20 includes improved alignment between spindle assemblies 46 disposed on each end of the axle housing assembly 20 and a strengthened joint without highly stressed fasteners.

The non driven axle assembly of this invention provides improvements over prior art axle assemblies by eliminating a highly stressed joint and providing improved alignment between spindle assemblies disposed on each end of the axle housing. These improvements also provide for improved manufacturing efficiencies by using standard parts such as the tubular axle assembly instead of relatively costly custom fabricated parts.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An axle assembly comprising:

an axle housing comprising a first plate spaced away from a second plate to define a first segment and a second segment;

a torque plate fixed to each of said first segment and said second segment along a portion of said axle housing mounted at least partially between said first plate and said second plate; and a spindle assembly fixed to each of said first segment and said second segment, wherein said spindle assembly includes a spindle housings and said torque plate includes an opening through which said spindle assembly extends and said axle housing includes a partial opening along a bottom portion adjacent each of said first segment and said second segment for receiving a portion of said spindle housing.

2. The assembly of claim 1, wherein each torque plate includes an opening for mounting of a brake assembly.

3. The assembly of claim 2, wherein each torque plate includes at least one extending flange, said at least one extending flange including mounting openings for said brake assembly.

4. The assembly recited in claim 1, wherein said spindle housing is welded to a surface of said axle housing transverse to said first plate and said second plate.

5. The assembly recited in claim 1, wherein said axle housing comprises a front plate and a back plate spaced apart from each other by a distance defining an opening corresponding to a width of said spindle housing.

6. The assembly of claim 1, further comprising a brake assembly mounted to each of said torque places.

7. A method of fabricating a non-driven axle assembly comprising the steps of:

a.) forming a substantially rectangular housing comprising a first plate spaced apart from a second plate to define an open first segment and an open second segment and at least a partially open bottom;

b.) welding a torque plate transverse to said first plate and said second plates over each of said open first segment and said open second segment, wherein said torque plate includes at least one mounting flange; and c.) mounting a brake assembly to each of said torque plates including fixing said brake assembly to said at least one mounting flange.

8. The method of claim 7, further comprising the step of installing a spindle assembly to each of said open first segment and said open second segment.

9. The method of claim 8, wherein each of said spindle assemblies comprises a spindle and a spindle housing, and each torque plate defines an opening for said spindle, said method further comprising the step of inserting said spindle through said opening in said torque plate and fixing said spindle housing to said rectangular housing.

10. A method of fabricating a non-driven axle assembly comprising the steps of:

a.) forming a substantially rectangular housing as an inverted U-shape comprising a first plate spaced apart from a second plate to define an open first segment and an open second segment disposed adjacent an axis of rotation, a center portion spaced a distance away from said axis of rotation, and a partially open bottom;

b) welding a torgue plate transverse to said first plate and said second plate over each of said open first segment and said open second segment; and c) mounting a brake assembly to each of said torque plates.

11. A method of fabricating a non-driven axle assembly comprising the steps of:

a) constructing an axle housing having first and second segments, and a bottom surface, said first and second segments defining an opening, and at least a portion of said bottom surface defining an opening;

b) fixing torque plates adjacent said first and second segments of said axle housing;

c.) fitting at least a portion of a tubular housing into said opening defined by said bottom surface of said axle housing;

d.) attaching said torque plates to said first and second segments of said axle housing; and e.) removing a portion of said tubular housing between said first and second segments of said axle housing.

12. The method of claim 11, wherein a cross-section of said axle housing is substantially rectangular.

13. The method of claim 11, wherein said tubular housing includes spindles disposed at each of said first and second segments.

14. The method of claim 11, wherein a remaining portion of said axle housing comprises a portion of said bottom surface of said axle housing.

15. The method of claim 11, wherein said torque plates close off said openings at said first and second segments of said axle housing.

* * * * *

UNITED STATES PATENT AND TRADEMARK OFFICE

CERTIFICATE OF CORRECTION

PATENT NO. : 6,966,612 B2

DATED : November 22, 2005

INVENTOR(S) : Philpott

It is certified that error appears in the above-identified patent and that said Letters Patent is hereby corrected as shown below:

Column 5,
Line 3, "housings" should read -- housing --.
Line 23, "places" should read -- plates --.
Line 31, "plates" should read -- plate --.

Column 6,
Line 11, "torgue" should read -- torque --.

Signed and Sealed this

Fourteenth Day of February, 2006

JON W. DUDAS
*Director of the United States Patent and Trademark Office*